(12) United States Patent
Atherton

(10) Patent No.: US 8,140,730 B2
(45) Date of Patent: Mar. 20, 2012

(54) SYSTEM RECONFIGURATION OF EXPANSION CARDS

(75) Inventor: William E. Atherton, Hillsborough, NC (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 12/540,172

(22) Filed: Aug. 12, 2009

(65) Prior Publication Data

US 2011/0040916 A1 Feb. 17, 2011

(51) Int. Cl.
G06F 13/00 (2006.01)
(52) U.S. Cl. .................. 710/301; 710/304; 710/305
(58) Field of Classification Search .......... 710/301–306, 710/104, 100
See application file for complete search history.

(56) References Cited

U.S. PATENT DOCUMENTS

| | | | |
|---|---|---|---|
| 7,174,411 B1 * | 2/2007 | Ngai | 710/316 |
| 7,293,125 B2 | 11/2007 | McAfee et al. | |
| 7,315,456 B2 | 1/2008 | Mondor et al. | |
| 7,363,417 B1 | 4/2008 | Ngai | |
| 7,447,825 B2 | 11/2008 | Chen | |
| 7,461,195 B1 | 12/2008 | Woodral | |
| 7,539,801 B2 * | 5/2009 | Xie et al. | 710/104 |
| 2008/0080491 A1 | 4/2008 | Saripalli | |
| 2008/0301605 A1 | 12/2008 | Ando et al. | |
| 2009/0063741 A1 * | 3/2009 | Lu | 710/301 |

* cited by examiner

*Primary Examiner* — Brian Misiura
*Assistant Examiner* — Kim Huynh
(74) *Attorney, Agent, or Firm* — Thomas Tyson; Jeffrey L. Streets

(57) ABSTRACT

A method and computer program product for improving or optimizing the configuration of expansion cards and expansion card slots in a computer system. The slot width of each slot is serially set to two or more link widths supported by the expansion card that is connect in each slot and each of the plurality of expansion cards is retrained at each of the set slot widths. The current link speed and a current link width for each of the plurality of expansion cards may be identified at each of the set slot widths to enable a determination of a configuration of the plurality of expansion cards within the plurality of expansion card slots that will improve collective throughput of the expansion cards. Optionally, the throughput of one expansion card may be prioritized over the throughput of another expansion card, such as those expansion cards or functionalities specified by user preferences or identified by system monitoring of loads placed on the expansion cards.

23 Claims, 5 Drawing Sheets

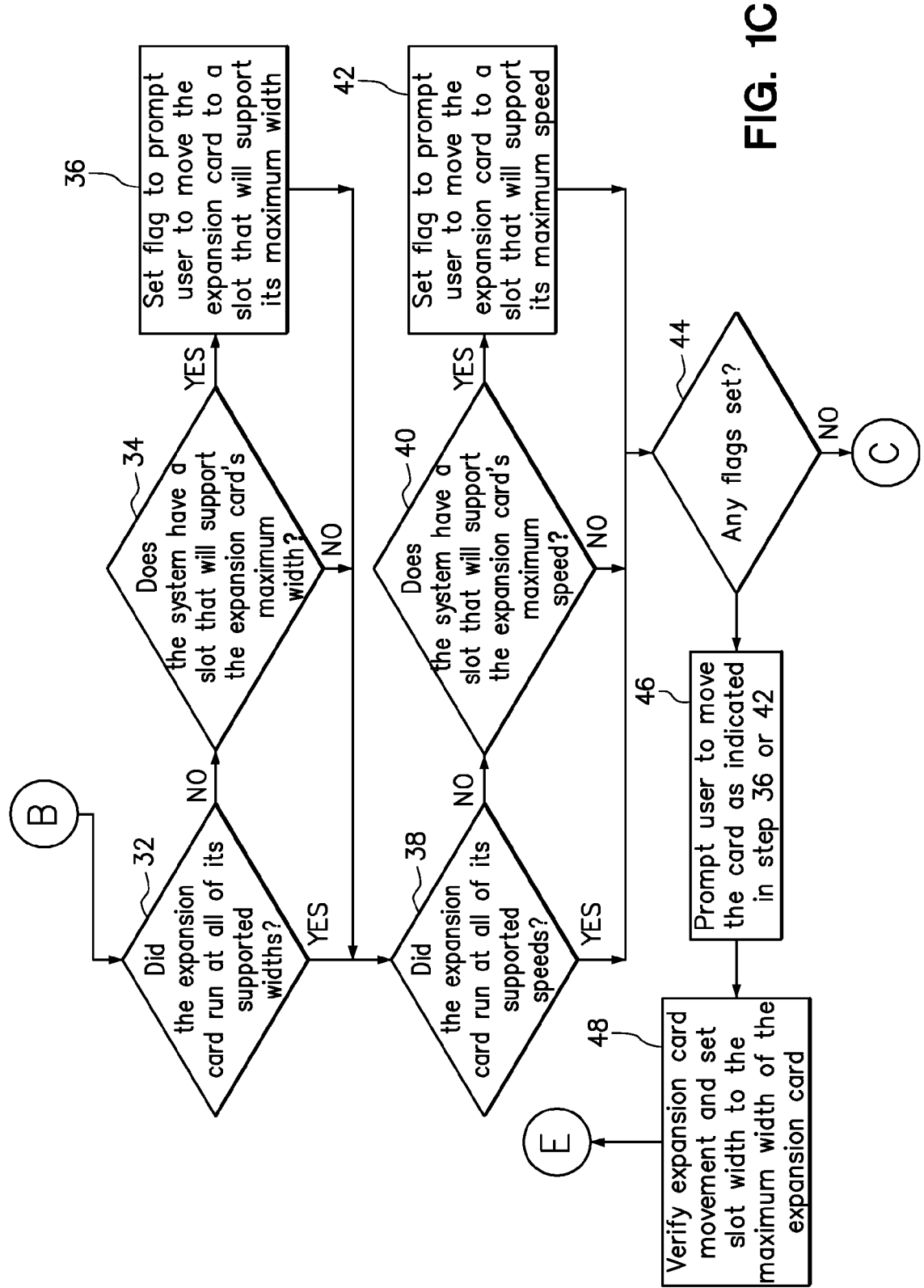

THROUGHPUT DETERMINATION

Expansion Card Slot ID/slot Capabilities ***

Expansion Card ID  
Supported Link Speeds **  
Maximum Link Width **

| Expansion Card Slot | Supported Link Widths | Card A PCIe x8 5 GT/s | | | Card B PCIe x8 5 GT/s | | | Card C PCIe x8 5 GT/s | | | Card D PCIe x8 5 GT/s | | |
|---|---|---|---|---|---|---|---|---|---|---|---|---|---|
| | | CS* | CW* | TP* | CS | CW | TP | CS | CW | TP | CS | CW | TP |
| Slot 1 PCIe x8 5 GT/s | x8 | 5 | 8 | 40 | 2.5 | 8 | 20 | ? | ? | ? | 5 | 8 | 40 |
| | x4 | 5 | 4 | 20 | 5 | 4 | 20 | 5 | 4 | 20 | 5 | 4 | 20 |
| | x2 | 5 | 2 | 10 | 5 | 2 | 10 | 5 | 2 | 10 | 5 | 2 | 10 |
| | x1 | 5 | 1 | 5 | 5 | 1 | 5 | 5 | 1 | 5 | 5 | 1 | 5 |
| Slot 2 PCIe x8 5 GT/s | x8 | 5 | 8 | 40 | 2.5! | 8! | 20! | ? | ? | ? | 5 | 8 | 40 |
| | x4 | 5 | 4 | 20 | 5 | 4 | 20 | 5 | 4 | 20 | 5 | 4 | 20 |
| | x2 | 5 | 2 | 10 | 5 | 2 | 10 | 5 | 2 | 10 | 5 | 2 | 10 |
| | x1 | 5 | 1 | 5 | 5 | 1 | 5 | 5 | 1 | 5 | 5 | 1 | 5 |
| Slot 3 PCIe x8 mech. PCIe x4 elect. 5 GT/s | x4 | 5 | 4 | 20 | 5 | 4 | 20 | 5 | 4 | 20 | 5 | 4 | 20 |
| | x2 | 5 | 2 | 10 | 5 | 2 | 10 | 5 | 2 | 10 | 5 | 2 | 10 |
| | x1 | 5 | 1 | 5 | 5 | 1 | 5 | 5 | 1 | 5 | 5 | 1 | 5 |
| Slot 4 PCIe x8 5 GT/s | x8 | 5 | 8 | 40 | 2.5 | 8 | 20 | ? | ? | ? | 5 | 8 | 40 |
| | x4 | 5 | 4 | 20 | 5 | 4 | 20 | 5 | 4 | 20 | 5 | 4 | 20 |
| | x2 | 5 | 2 | 10 | 5 | 2 | 10 | 5 | 2 | 10 | 5 | 2 | 10 |
| | x1 | 5 | 1 | 5 | 5 | 1 | 5 | 5 | 1 | 5 | 5 | 1 | 5 |

*Current Speed (CS) and Current Width (CW) are obtained from the Link Status Register; Throughput (TP) is calculated. Both CS and TP are in units of GT/s.  
**Obtained from the Link Capabilities Register of each expansion card  
*** Obtained from System BIOS  
! Expansion Card B is determined to operated at 2.5 GT/s at x8 slot width

FIG. 2

SYSTEM RECONFIGURATION OF EXPANSION CARDS

BACKGROUND OF THE INVENTION

1. Field of the Invention

The present invention relates to the use of expansion cards in a computer system, and more specifically to improving the performance of expansion cards.

2. Background of the Related Art

Computers are an important tool in performing a wide variety of tasks, including information storage and retrieval, word processing, numerical calculation, graphical design, three-dimensional modeling, internet browsing, electronic communications, video streaming, and gaming. In fact the range of computer capabilities increases over time as software programmers and developers produce new and improved application programs. However, every application program depends upon computer hardware to operate. In fact, the ever expanding types and capabilities of application programs seem to require every expanding hardware capabilities. Whether the hardware capabilities present new functionalities not previous included in a given computer or simply an additional amount of an existing functionality, the capabilities of a given computer may be increased by installing one or more expansion cards.

An expansion card is a printed circuit board that may be installed in an expansion slot on a computer motherboard in order to provide additional functionality to the computer or computer system. Common expansion card types include, for example, video cards, sound cards, network cards, and memory cards. Typically, each expansion card has an edge connector that fits into an expansion slot on the motherboard to provide both physical support for the expansion card and electrical communication between the expansion card and the motherboard. However, the number of expansion cards that may be accommodated in a given computer will vary in accordance with the number of expansion slots provided on the motherboard. Furthermore, an expansion slot may be used only with a compatible expansion card, meaning that the expansion card must provide an interface that is physically and electrically similar to the expansion card. Generally, the need for compatibility has been addressed by the development of computer expansion card standards, which allow expansion cards to be developed and produced by various manufacturers knowing that they will operate properly with expansion slots following the same standard.

Peripheral Component Interconnect Express (otherwise referred to as "PCI Express" or "PCIe") is a computer standard used for motherboard-level interconnect interfaces as well for expansion card interfaces. PCIe adopts point-to-point serial links, whereas older PCI, PCI-X and AGP standards relied on a shared parallel bus architecture. The significant differences in electrically signaling and bus protocol of PCIe require a PCIe expansion card and a PCIe expansion slot to have a different mechanical form factor than with other standards.

PCIe devices communicate over a logical connection called an interconnect or link. A link is a point-to-point communication channel between two PCIe devices. Each link includes one or more lanes, wherein each lane includes a differential pair of conductors for transmitting and a differential pair of conductors for receiving. A PCIe slot may provide from one to thirty-two lanes, in powers of two (i.e., 1, 2, 4, 8, 16 or 32 lanes). The lane count for a particular PCIe slot is written with an "x" prefix, such that an eight lane slot would be referred to as an "x8 slot." However, the number of lanes actually connected to a slot may be less than the physical size of the slot. For example, a slot may have the physical width of an x8 slot (and will physically receive an expansion card having a width of x1, x2, x4 or x8), yet will electrically support only one lane of communication. Such a slot may be referred to as an "x8 mechanical, x1 electrical slot" or as an "x8 (x1 mode) slot."

The PCIe standard has already been released in multiple generations. In PCIe 1.x, each lane has a transfer rate of 2.5 GT/s. PCIe 2.x can signal at a transfer rate of either 2.5 GT/s (Gen1 mode) or 5 GT/s (Gen2 mode). Still further, PCIe 3.0 can signal at a transfer rate of 2.5 GT/s (Gen1 mode), 5 GT/s (Gen2 mode) or 8 GT/s (Gen3 mode). However, these standards do not require that a device be able to operate at the maximum transfer rate or speed at its maximum lane width.

By making the lane count flexible and supporting different transfer rates, the PCIe standard enables the use of high-bandwidth expansion cards as well as low-bandwidth expansion cards. The actual number of lanes used by an expansion card, as well as the transfer rate at which those lanes are operated, is determined when the link is powered on or instructed to retrain by an algorithm programmed into the expansion card by the expansion card vendor. Accordingly, an expansion card may operate at a width and speed that it has determined as providing the best performance within the slot that it is installed in.

BRIEF SUMMARY OF THE INVENTION

A first embodiment of the present invention provides a computer program product including computer usable program code embodied on a computer readable storage medium for determining the best expansion card slot for an expansion card installed in a computer. This computer program product comprises: computer usable program code for setting the slot width of the first expansion card slot connected to the expansion card, wherein the slot width of the first expansion card slot is serially set to two or more of the link widths supported by the expansion card; computer usable program code for retraining the expansion card at each of the set slot widths; computer usable program code for measuring a current link speed and a current link width for the expansion card at each of the set slot widths; computer usable program code for identifying link capabilities for the first and second expansion card slots in a computer system, wherein the link capabilities of each slot include a link speed and a link width supported by each slot; and computer usable program code for determining which one or more of the first and second slots will provide the greatest throughput of the expansion card.

A second embodiment of the invention provides a computer program product including computer usable program code embodied on a computer readable storage medium for analyzing the physical configuration of expansion cards installed in a computer. The computer program product comprises: computer usable program code for serially setting the slot width of the first expansion card slot to two or more link widths supported by the first expansion card; computer usable program code for serially setting the slot width of the second expansion card slot to two or more link widths supported by the second expansion card; computer usable program code for retraining the first and second expansion cards at each of the two or more slot widths; computer usable program code for identifying a current link speed and a current link width for each of the first and second expansion cards at each of two or more slot widths; computer usable program code for identifying a maximum link speed and a maximum link width supported by the first slot; computer usable program code for identifying a maximum link speed and a maximum link width supported by the second slot; and computer usable program code for determining a configuration of the first and second expansion cards within the first and second expansion card slots that will provide the greatest throughput of the first and second expansion cards.

A third embodiment of the invention provides a computer program product including computer usable program code embodied on a computer readable storage medium for analyzing the physical configuration of expansion cards installed in a computer. This computer program product comprises: computer usable program code for setting the slot width of each slot connected to one of the plurality of expansion cards, wherein the slot width of each slot is serially set to two or more link widths supported by the expansion card that is connect in each slot; computer usable program code for retraining each of the plurality of expansion cards at each of the set slot widths; computer usable program code for identifying a current link speed and a current link width for each of the plurality of expansion cards at each of the set slot widths; computer usable program code for identifying link capabilities for each of a plurality of expansion card slots in a computer system, wherein the link capabilities for each slot include a link speed and a link width supported by the slot; and computer usable program code for determining a configuration of the plurality of expansion cards within the plurality of expansion card slots that will improve collective throughput of the expansion cards.

BRIEF DESCRIPTION OF THE SEVERAL VIEWS OF THE DRAWINGS

FIGS. 1A-D provide a flowchart of one embodiment of a method for analyzing the physical configuration of expansion cards installed in a computer and recommending one or more alternative configurations.

FIG. 2 is a table that provides an example of the data collection and analysis performed in accordance with one embodiment of the invention.

DETAILED DESCRIPTION OF THE INVENTION

Figure 1A:
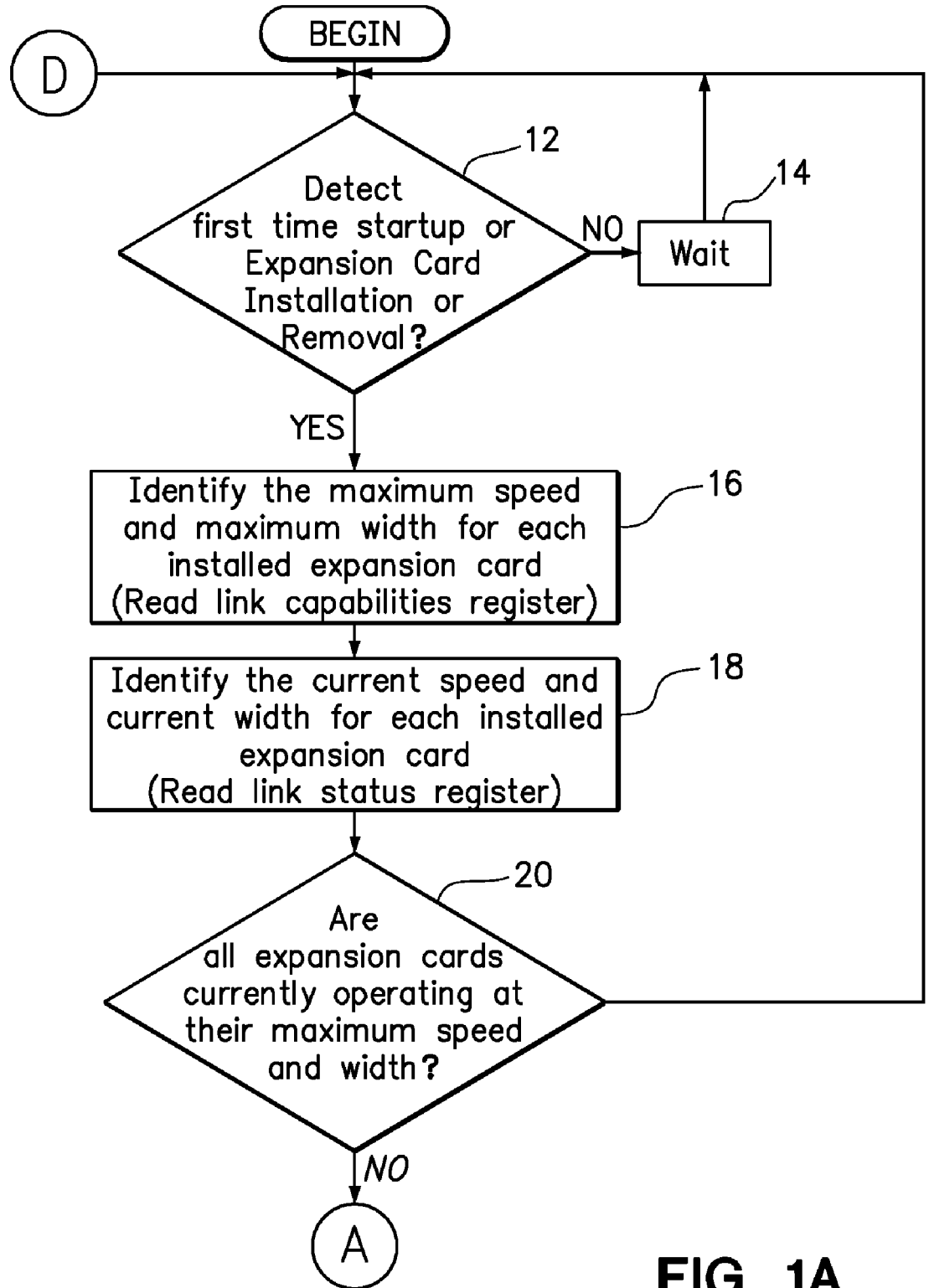

One or more embodiments of the present invention enable a computer system to improve or optimize the configuration of expansion cards and expansion card slots, whereas previously known methods only allowed an individual expansion card to improve or optimize its own performance in view of its installation within a given expansion card slot. Although the present methods may be used to maximum the collective throughput of the expansion cards, the method may also be adapted to achieve more complex objectives or combinations of objectives once the expansion cards and expansion card slots have been characterized. For example, embodiments of the invention may prioritize the throughput of one expansion card over the throughput of another expansion card, such as those expansion cards or functionalities specified by user preferences or identified by system monitoring of loads placed on the expansion cards. Specifically, the methods may maximize the throughput of one or more prioritized expansion cards, while secondarily improving or optimizing the configuration of the remaining expansion cards in the remaining expansion card slots. It should also be recognized that any configuration may be reassessed over time, particularly following installation or removal of one or more expansion card, detection that error rates in one of the expansion card slots has increased, or the expansion cards have been re-prioritized by a user or the system.

Embodiments of the invention may be described herein in terms of a method, but such methods will typically be performed by a computer program product including computer usable program code embodied on a computer readable storage medium. Therefore, all disclosure or discussion of methods and method steps to follow should be understood to applicable to computer program products encompassed by the present invention, where the steps involve computer usable program code.

A first embodiment of the present invention provides a method or computer program product for determining the best expansion card slot for an expansion card installed in a computer system having a first expansion card slot and a second expansion card slot. The method comprises setting the slot width of the first expansion card slot connected to the expansion card. In order to characterize the how the expansion card will perform at different slot widths, the chipset may controllable set the slot width to a value other than the full width of the slot. Accordingly, the slot width of the first expansion card slot is serially set to two or more of the link widths supported by the expansion card, and the expansion card is retrained at each of the set slot widths. As used herein, the term "retrain" means to cause the expansion card to reassess its own link width and speed. Although retraining the expansion card may include steps similar to resetting the power to the expansion card, retraining does not require that power be turned off and does not require that the expansion card will actually changes its link width or speed.

Still further, the method of this first embodiment comprises identifying a current link speed and a current link width for the expansion card at each of the set slot widths. The current link speed and the current link width may be obtained by reading the Link Status Register in a PCIe-compliant expansion card. Alternatively, the current link speed and current link width could be identified by applying a load to the expansion card and running a diagnostic tool on the transfer rate and link width actually utilized, but this would require much greater system resources than simply reading the Link Status Register. It should also be recognized that if the method is being used to maximize throughput of the expansion card, it may be suitable to identify a throughput of the expansion card at each of the set slot widths. Still, using the current link speed and the current link width data from the Link Status Register may be the simplest way to obtain the throughput. Once throughput at each of the set slot widths is identified, the current link speed and current link width data may no longer be needed.

The method of the first embodiment further comprises identifying link capabilities for the first and second expansion card slots in the computer system. The link capabilities of the first and second slot preferably include a maximum link speed and a maximum link width that are supported by each slot. The link capabilities of each slot are typically programmed in the system BIOS by the manufacturer of the motherboard. As discussed in greater detail below with respect to other embodiments, identifying the link capabilities of each slot enables the method to avoid setting the slot width to values that the slot is incapable of supporting. Furthermore, identifying the link capabilities of the first and second slots, along with the previous determinations of the expansion card's throughput at various slot widths, allows the method to determine which one or more of the first and second slots will provide the greatest throughput of the expansion card.

Determining which one or more of the first and second slots will provide the greatest throughput of the expansion card may include determining and comparing the maximum throughput of the expansion card in the first slot and the maximum expected throughput of the expansion card in the second slot. The maximum throughput is generally identifying as the greatest multiple of the identified current link speed and the identified current link width of the expansion card at any one of the link widths supported by a given slot. The maximum expected throughput is identified in the same manner, except that it has not actually been measured because the expansion card has not actually been installed in the second slot. Still, the maximum expected throughput can be identified with some high degree of confidence since the method has access to the second slot's capabilities, available to the BIOS, and has characterized the expansion card's throughput (i.e., width and speed) albeit in the first slot.

The method may optionally further comprise identifying link capabilities for the expansion card connected in the first expansion card slot of. The link capabilities for the expansion card include link widths supported by the expansion card and a maximum speed of the expansion card at each supported link width. At least during an initial instance of the determination, the link capabilities of for the first expansion card may be obtained by reading the Link Capabilities Register in a PCIe-compliant expansion card. Identifying the link capabilities of any expansion card allow the system or method to determine whether the expansion card has the ability to run at greater widths or speeds than the first expansion card slot is able to support. For example, if the expansion card supports an x8 width while the expansion card slot receiving the card can only support x8 mechanical, x4 electrical, then the slot width can not be set any wider than x4 and the system or method will not be able to test the expansion card at x8 width. In a further option, the system or method may be prompted to move the card to slot that supports the full x8 width of the expansion card for further testing. Where more than one expansion card is involved, it is preferable to complete testing of all cards at the available slot widths before moving any of the cards since it is likely that one of the cards will be moved to the lower capability, x4 electrical slot.

A second embodiment of the invention provides a method and computer program product for analyzing the physical configuration of first and second expansion cards installed in a computer. The method comprises serially setting the slot width of the first expansion card slot to two or more link widths supported by the first expansion card, and the slot width of the second expansion card slot is serially set to two or more link widths supported by the second expansion card. Accordingly, each expansion card is set to only one link width at a time, but during the method each expansion card is set to two or more link widths that are supported by the respective expansion card and the respective slot. During the time period that the first and second expansion card slots are set to a particular slot width, the first and second expansion cards are retrained at each of the two or more slot widths. This means that both of the first and second expansion cards are caused to reassess the width and speed at which they operate for each of the two or more slot widths that are set. It is during this operation, that the method may identify a current link speed and a current link width for each of the first and second expansion cards at each of two or more slot widths. The first and second expansion cards are preferably simultaneously retrained at the different slot widths to save time. However, it is also possible to set the slot width of only one slot at a time and retrain only the expansion card in that individual slot before advancing to a different slot width of the same slot or advancing to a different slot altogether. Furthermore, the initial configuration of the slots and cards may support a different number of slot widths, so that one or more expansion cards may take more iterations of retraining than others if the expansion card performance is going to be fully characterized.

The method of the second embodiment further comprises identifying a maximum link speed and a maximum link width supported by the first slot, and identifying a maximum link speed and a maximum link width supported by the second slot. The method also comprises determining a configuration of the first and second expansion cards within the first and second expansion card slots that will provide the greatest throughput of the first and second expansion cards. The method may determine that the existing configuration provides the greatest throughput, that there is no throughput advantage between the initial and alternative configurations, or that the first and second expansion cards should be swapped between the first and second slots to provide the greatest throughput.

Determining a configuration that provides the greatest throughput may include determining the maximum throughput of each combination of the first and second expansion cards in the first and second slot, where the maximum throughput is generally identifying as the greatest multiple of the identified current link speed and the identified current link width of the expansion card at any one of the link widths supported by a given slot. The method may also compare the cumulative throughput of the first and second expansion cards configured in the first and second expansion card slots, respectively, with the cumulative throughput of the first and second expansion cards configured in the second and first expansion card slots, respectively. Depending upon the existence and nature of user preferences, the configuration of the first and second expansion cards that provides the greatest cumulative throughput will generally be the recommended configuration. Configurations that meet other system objectives may also be recommended as alternative configurations.

Similar to the first embodiment, the method of this second embodiment may optionally comprise identifying link capabilities for a first expansion card connected in a first expansion card slot of a computer system, wherein the link capabilities for the first expansion card include link widths supported by the first expansion card and a maximum speed of the first expansion card, and identifying link capabilities for a second expansion card connected in a second expansion card slot of a computer system, wherein the link capabilities for the second expansion card include link widths supported by the second expansion card and a maximum speed of the second expansion card. Identifying the link capabilities of each expansion card allows the system or method to determine situations where the slot receiving the card may be limiting the throughput of the expansion card.

A third embodiment of the invention provides a method and computer program product for analyzing the physical configuration of expansion cards installed in a computer. This method is substantially similar to the first and second embodiments, described above, but attempts to configure more than two expansion cards and most preferably determines a configuration for all of the expansion cards installed on an individual computer motherboard in a coordinated manner.

Accordingly to this third embodiment, the method sets the slot width of each slot that is connected to one of a plurality of expansion cards, wherein the slot width of each slot is serially set to two or more link widths supported by the expansion card that is connect in each slot. At each of the slot widths at which the slot is set, the plurality of expansion cards are retrained, such that a current link speed and a current link width for each of the plurality of expansion cards may be identified at each of the set slot widths. Link capabilities are identified for each of the plurality of expansion card slots in the computer system, wherein the link capabilities for each individual slot include a link speed and a link width supported by the slot. The method may then determine a configuration of the plurality of expansion cards within the plurality of expansion card slots that will improve collective throughput of the expansion cards. Optionally, the method may further comprise identifying link capabilities for each of the plurality of expansion cards connected in the plurality of slots in the computer system, wherein the link capabilities for each expansion card include each link width supported by the expansion card and a maximum speed supported by the expansion card.

In a further embodiment, a configuration may be determined in part by calculating the cumulative throughput of the plurality of expansion cards for a plurality of possible configurations. Optionally, calculation of the cumulative throughput may comprise determining the maximum throughput of every combination of one of the plurality of expansion cards and one of the plurality of slots by identifying the greatest multiple of the identified current link speed and the identified current link width of the expansion card.

Any of the foregoing embodiments may be carried out by a computer program product including computer usable program code embodied on a computer readable storage medium. Such computer readable storage medium may comprise system BIOS, the operating system or an application program. In any of the various embodiments of the invention, the expansion cards may comprise a link capabilities register and may also comprising a link status register. Both of these registers are present on PCIe-compliant expansion cards. Under the PCIe standards, the link capabilities register stores data indicating supported link speeds and maximum link width of the expansion card, and the link status register stores data indicating a current link speed of the expansion card.

Configurations determined in accordance with any of the embodiments of the invention may be output to a user in various manners, including a visual display such as a pop-up window or an LED indicator display, or an audio signal such as an alarm. Alternatively, the configuration may be stored in a system diagnostic file that requires the user to take some steps to view the configuration.

Optionally, a configuration may optimize the throughput of one of the expansion cards without regard to the throughput of the other expansion cards. This may be the case where a user has established a preference that a particular expansion card or a particular functionality should be prioritized to achieve its maximum throughput. Alternatively, a configuration may optimize the throughput of one particular expansion card or particular functionality as a result of monitoring usage of the particular expansion card or functionality and identifying the need to optimize that particular expansion card or functionality. Furthermore, a recommended configuration of the expansion cards may correlate throughput with the monitored usage of each expansion card.

The various embodiments of the invention may be performed at one or more times during the life of the computer system, but may be performed at initial system startup. Separately, the method may be executed, with or without preparing and providing a new configuration for the currently installed expansion cards, in response to detecting a condition selected from the group consisting of expansion card removal and expansion card installation, wherein the removal or installation of an expansion card results in a change in currently installed expansion cards or their configuration among the slots. In a further option, the method may be executed in response to detecting a condition selected from the group consisting of a change in the configuration of the expansion cards, a change in user preference of one or more expansion card priority, and a change in load applied to one or more of the expansion cards.

Any of the embodiments herein may also store the identified current link speed and current link width for each of the plurality of expansion cards at each of the set slot widths. Preferably, the stored link speed and link width data is used in subsequent configuration determinations, such that this data does not have to be regenerated.

It should be recognized that even if throughput of each expansion card is determined at every slot width supported by the slot in which it is received, it is possible that the expansion card supports one or more link widths that are even greater. Accordingly, embodiments of the invention may, after making an initial configuration, further comprise determining that an expansion card has been moved to an expansion card slot that supports one or more additional slot width for which there is no stored link speed and link width associated with the moved expansion card. This presents the opportunity for the system to further characterize the expansion card. Therefore, the slot width of the slot connected to the moved expansion card may be set to the one or more additional slot width, so that the expansion card may be retrained at each of the one or more additional slot widths. At each of the one or more additional slot widths, a current link speed and a current link width for the moved expansion card may be determined. The method may then determine a configuration of the plurality of expansion cards within the plurality of expansion card slots that will improve collective throughput of the expansion cards.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1B:
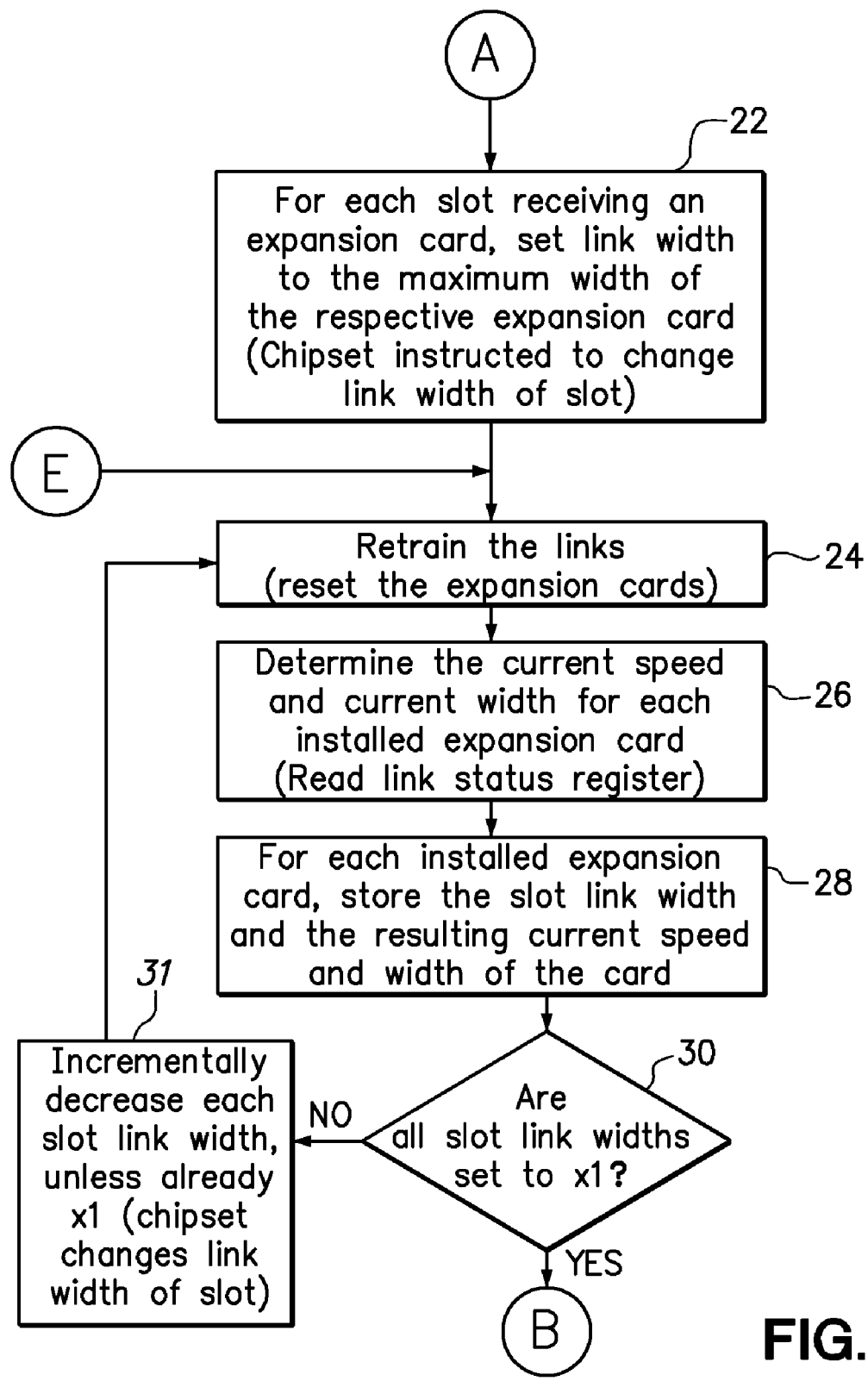

Referring now to FIGS. 1A-C, a flowchart is provided in accordance with one embodiment of a method for analyzing the physical configuration of expansion cards installed in a computer and recommending one or more alternative configurations. In step 12 of FIG. 1A, it is determined whether first time startup of the computer system or expansion card installation or removal has been detected. If not, then the method waits in step 14 before returning to step 12. If either of the conditions in step 12 are detected, then in step 16 includes determining the maximum speed and maximum width for each installed expansion card, for example by reading the link capabilities register of each PCIe-compliant expansion card. Step 18 then includes determining the current speed and current width for each of the expansion cards installed in the computer system, for example by reading the link status register of each PCIe-compliant expansion card. Step 20 may then determines whether or not all of the installed expansion cards are currently operating at their maximum speed and width. If so, then there is no opportunity to improve the configuration and the method returns to step 12. However, if less than all of the installed expansion cards are operating at their maximum speed and width, then the method continues to step 22 (See FIG. 1B).

Referring now to FIG. 1B, step 22 sets the link width to the maximum width of the respective expansion card for each slot receiving an expansion card, for example by instructing the chipset to change the link width of each slot. In step 24, each of the links is retrained. When the expansion cards are ready to be used, step 26 determines the current speed and current width for each of the installed expansion cards. Optionally, the current speed and width may be obtained by reading the link status register. For each installed expansion card, the slot link width and the resulting current speed and width of the expansion card is stored in step 28. It is then determined, in step 30, whether all of the slot link widths are set to x1 (the minimum possible link width). If not, then step 31 incrementally decreases the link width of each slot unless it is already at x1. Once all of the slots have been set to x1, then the method continues to step 32 (See FIG. 1C).

It should be noted that the invention is certainly not limited to methods that begin a maximum slot width and proceed incrementally to narrower slot widths until the expansion cards have been characterized (i.e., current speed and width identified) at all support slot widths. This is just one way to characterize the expansion cards. Alternative steps may begin at minimum slot widths and work upward, change the slot width in any order, and/or use only a subset of supported slot widths.

Referring now to FIG. 1C, step 32 then determines whether each expansion card ran at all of its supported widths, such as its maximum width. If the expansion card did not, then step 34 determines whether the system has a slot that will support the expansion card's maximum width. If the system has such a slot that supports the expansion card's maximum width that was not run, then in step 36 a flag is set to prompt the user to move the expansion card to one of the slots that will support its maximum width.

Following either of steps 32-36, step 38 determines whether the expansion card was run at all of its supported speeds. If the expansion card did not, then step 40 determines whether the system has a slot that will support the expansion card's maximum speed. If the system has such a slot that supports the expansion card's maximum speed that was not run, then in step 42 a flag is set to prompt the user to move the expansion card to one of the slots that will support its maximum speed. Following either of steps 38-42, the method continues to step 44 (See FIG. 1D). Moving the expansion card to a slot that supports its maximum width and/or speed, allows the method to fully characterize the performance of the expansion card despite the limitations of the slot in which it is currently installed.

If step 44 determines that a flag has been set, then the method prompts the user to move the expansion card as indicated in either step 36 or step 42, depending upon where the flag was set. Then in step 48, movement of the expansion card is verified and the slot width is set to the maximum width of the expansion card in preparation for further testing of the expansion card starting at step 22. If step 44 finds that no flags are set, then the method continues to step 50 (See FIG. 1D).

Figure 1D:
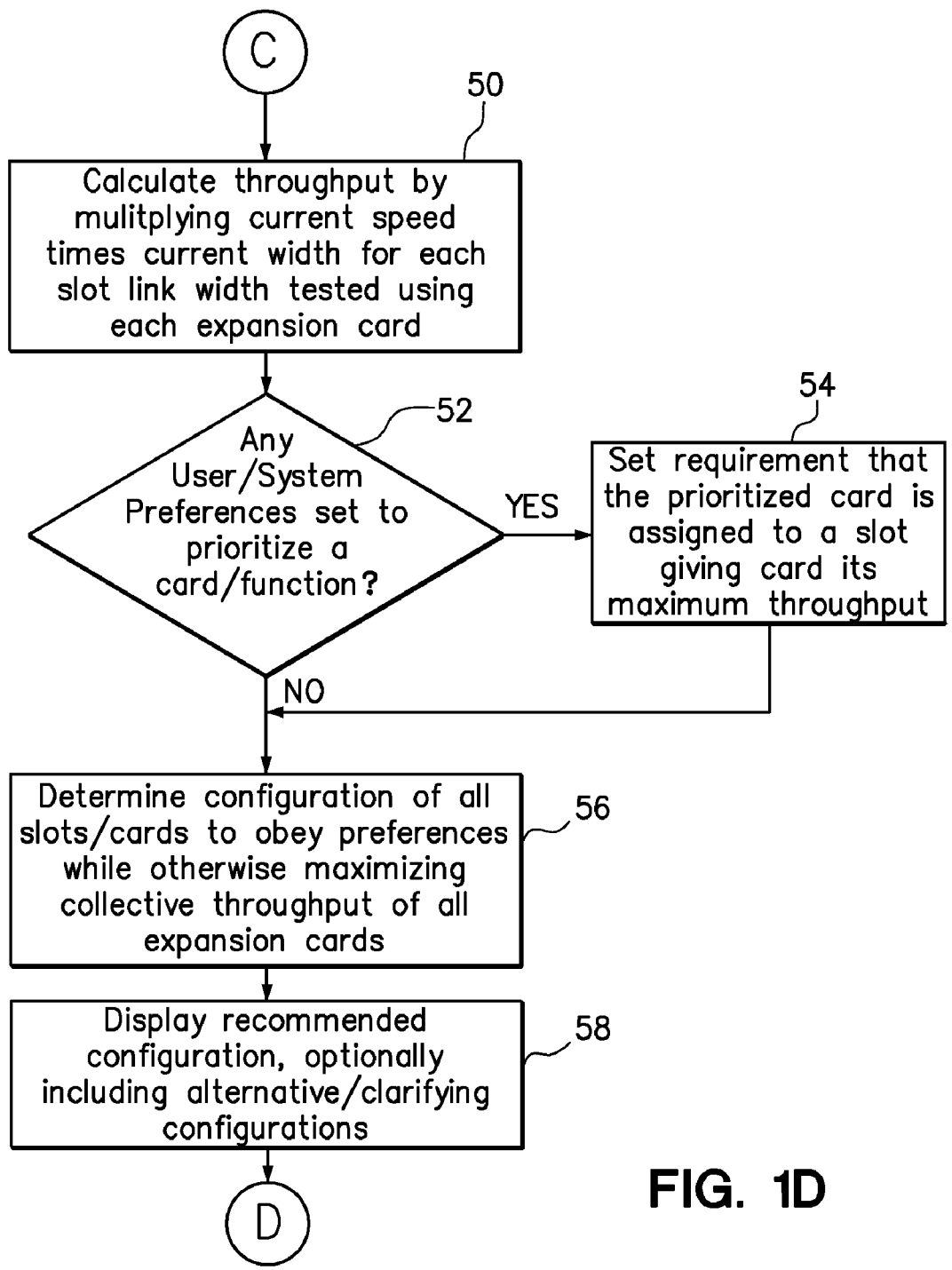

Referring now to FIG. 1D, steps 50-58 describe an analytical phase of the method. Step 50 calculates throughput by multiplying current speed times current width for each slot link width tested using each expansion card. If any user or system preferences have been set to prioritize a particular expansion card or functionality in step 52, then step 54 requires that the prioritized card is assigned to a slot, possibly any one a several slots, identified as allowing the card to achieve its maximum throughput. If there are no preferences set in step 52 or after any prioritized expansion cards have been assigned, then step 56 determines a configuration of all slots and cards, preferably obeying the preferences while otherwise maximizing the collective throughput of all expansion cards. A recommended configuration may then be displayed in step 58, optionally including one or more alternative or clarifying configurations. Following step 58, the method returns to step 12 (See FIG. 1A).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 is a table that provides an example of the data collection and analysis performed in accordance with one embodiment of the invention. The left side of the table identifies four expansion card slots (Slots 1-4) on a motherboard, along with information about their slot capabilities (width and speed) that has been obtained from the system BIOS. Data related to each slot is set out in the rows of the table. Along the top of the table, four expansion cards (Cards A-D) are identified as having been installed in the slots. Information about each expansion card (maximum width and maximum speed) is set out below the card ID, as obtained from the link capabilities register of each expansion card. In this illustration, Card A is installed in Slot 1, Card B is installed in Slot 2, Card C is installed in Slot 3, and Card D is installed in Slot 4. For convenience reference, data in the body of the table that is associated with these card/slot combinations has been shaded. Other data in the body of the table describes the expected performance of other card/slot combinations.

Each slot has an identified maximum supported slot width and will support any lesser slot width. For example, Slot 1, Slot 2 and Slot 4 have a maximum slot width of x8 and can support slot widths of x8, x4, x2 and x1. These widths are listed in the column entitled "Supported Link Widths" next to each of Slot 1, Slot 2 and Slot 4. However, Slot 3 in this example has a mechanical width of x8, but only an electrical width of x4. Accordingly, Slot 3 can only support Card C at widths of x4, x2 and x1. This means that the width and speed of Card C cannot be determined in accordance with the invention, without moving Card C to another slot.

In order to characterize each expansion card, the method sets the each slot to a supported slot width and retrains the card. Then, the current width (CW) and current speed (CS) of each expansion card is identified before setting each slot to another supported slot width. After identifying the current width and current speed of each card at each slot width, the throughput of the card at each slot width can be calculated by multiplying the current speed and current width in the same row of the table. Accordingly, the data in the shaded regions of the table is complete.

The data in the shaded regions yields information about the present throughput of each of the initial expansion card/slot combinations, but also provides information about how each expansion card might operate if it were moved to another slot on the motherboard. For example, since Slot 1, Slot 2 and Slot 4 are each PCIe x8, 5 GT/s slots, any expansion card in the system should perform equally in any of those three slots. In the example of FIG. 2, Slot 3 is unique in that is a PCIe x8 mechanical, x4 electrical, 5 GT/s slot. Also, Card B is unique in that, although the link capabilities register has identify its maximum width as x8 and its maximum speed as 5 GT/s, it has been shown to operate at 5 GT/s only at x4, x2 and x1 widths and reduces its speed to 2.5 GT/s at an x8 width. This means that Card B is not able to take full advantage of the capabilities of Slot 2 and would operate at the same throughput if moved from Slot 2 to Slot 3. To accommodate this, Card C may be moved to Slot 2 with at least no reduction in throughput. Still, it is possible that Card C may increase its throughput when moved to Slot 2, because the link capabilities register has indicated that Card C has a maximum link speed of 5 GT/s and supports a link width of x8. Unfortunately, Card C was not characterized at x8 because Slot 3 was limited to a width of x4 electrical. Even though it is not certain to produce a benefit, the method may recommend a configuration that moves Card B to Slot 3 and moves Card C to Slot 2 on basis that the cumulative throughput may in fact increase and in certain not to decrease.

In accordance with preferred embodiments, the speed and width data (or alternatively only the throughput) is stored for each card at each slot width. In particular, the throughput of Card B at x8 is preferably stored despite the fact that Slot 3 will limit Card B to operation at an x4 width, since the information may be helpful in a subsequent iteration of the process. Furthermore, once Card C has been moved to Slot 2, the slot width may be set to x8 in order to identify the resulting current width and speed of Card C, which would then complete the data for Card C.

The table in FIG. 2 is just one example provided to further describe the invention, and should not be taken as limiting of the scope of the invention. It should also be understood that other generations of the PCIe standard, or similar standards that may arise in the future, exist and are anticipated to be implemented over time. These other standards may lead to the availability of expansion cards and slots that support additional speeds and widths. However, the principles and steps discloses herein are equally applicable to devices that support any number of speeds and widths.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a computer readable storage medium for determining the best expansion card slot for an expansion card installed in a computer, the computer program product comprising:
    computer usable program code for setting the slot width of the first expansion card slot connected to the expansion card, wherein the slot width of the first expansion card slot is serially set to two or more of the link widths supported by the expansion card;
    computer usable program code for retraining the expansion card at each of the set slot widths;
    computer usable program code for measuring a current link speed and a current link width for the expansion card at each of the set slot widths;
    computer usable program code for identifying link capabilities for the first and second expansion card slots in a computer system, wherein the link capabilities of each slot include a link speed and a link width supported by each slot; and
    computer usable program code for determining which one or more of the first and second slots will provide the greatest throughput of the expansion card.

2. The computer program product of claim 1, wherein the computer usable program code for determining which one or more of the first and second slots will provide the greatest throughput of the expansion card comprises:
    computer usable program code for determining the maximum throughput of the expansion card in the first slot by identifying the greatest multiple of the identified current link speed and the identified current link width of the expansion card at any one of the two or more link widths supported by the first slot; and
    computer usable program code for determining the maximum throughput of the expansion card in the second slot by identifying the greatest multiple of the identified current link speed and the identified current link width of the expansion card at any one of the two or more link widths supported by the second slot.

3. The computer program product of claim 1, further comprising:
    computer usable program code for identifying link capabilities for an expansion card connected in a first expansion card slot of a computer system having the first expansion card slot and a second expansion card slot, wherein the link capabilities for the expansion card include link widths supported by the expansion card and a maximum speed of the expansion card at each supported link width.

4. A computer program product including computer usable program code embodied on a computer readable storage medium for analyzing the physical configuration of expansion cards installed in a computer, the computer program product comprising:
    computer usable program code for serially setting the slot width of the first expansion card slot to two or more link widths supported by the first expansion card;
    computer usable program code for serially setting the slot width of the second expansion card slot to two or more link widths supported by the second expansion card;
    computer usable program code for retraining the first and second expansion cards at each of the two or more slot widths;
    computer usable program code for identifying a current link speed and a current link width for each of the first and second expansion cards at each of two or more slot widths;
    computer usable program code for identifying a maximum link speed and a maximum link width supported by the first slot;
    computer usable program code for identifying a maximum link speed and a maximum link width supported by the second slot; and
    computer usable program code for determining a configuration of the first and second expansion cards within the first and second expansion card slots that will provide the greatest throughput of the first and second expansion cards.

5. The computer program product of claim 4, wherein the computer usable program code for determining a configuration comprises:
    computer usable program code for determining the maximum throughput of the first expansion card in the first slot by identifying the greatest multiple of the identified current link speed and the identified current link width of the expansion card at any one of the two or more link widths supported by the first slot;
    computer usable program code for determining the maximum throughput of the second expansion card in the second slot by identifying the greatest multiple of the identified current link speed and the identified current link width of the expansion card at any one of the two or more link widths supported by the second slot;
    computer usable program code for determining the maximum expected throughput of the first expansion card in the second slot by identifying the greatest multiple of the identified current link speed and the identified current link width of the expansion card at any one of the two or more link widths supported by the second slot;
    computer usable program code for determining the maximum expected throughput of the second expansion card in the first slot by identifying the greatest multiple of the identified current link speed and the identified current link width of the expansion card at any one of the two or more link widths supported by the first slot; and
    computer usable program code for comparing the cumulative throughput of the first and second expansion cards configured in the first and second expansion card slots, respectively, with the cumulative throughput of the first and second expansion cards configured in the second and first expansion card slots, respectively.

6. The computer program product of claim 4, further comprising:
    computer usable program code for identifying link capabilities for a first expansion card connected in a first expansion card slot of a computer system, wherein the link capabilities for the first expansion card include link widths supported by the first expansion card and a maximum speed of the first expansion card;
    computer usable program code for identifying link capabilities for a second expansion card connected in a second expansion card slot of a computer system, wherein the link capabilities for the second expansion card include link widths supported by the second expansion card and a maximum speed of the second expansion card; and
    computer usable program code for determining whether the link capabilities of the first expansion card are greater than the link capabilities of the first slot and whether the link capabilities of the second expansion card are greater than the link capabilities of the second slot.

7. A computer program product including computer usable program code embodied on a computer readable storage medium for analyzing the physical configuration of expansion cards installed in a computer, the computer program product comprising:
    computer usable program code for setting the slot width of each slot connected to one of the plurality of expansion cards, wherein the slot width of each slot is serially set to two or more link widths supported by the expansion card that is connect in each slot;
    computer usable program code for retraining each of the plurality of expansion cards at each of the set slot widths;
    computer usable program code for identifying a current link speed and a current link width for each of the plurality of expansion cards at each of the set slot widths;
    computer usable program code for identifying link capabilities for each of a plurality of expansion card slots in a computer system, wherein the link capabilities for each slot include a link speed and a link width supported by the slot; and
    computer usable program code for determining a configuration of the plurality of expansion cards within the plurality of expansion card slots that will improve collective throughput of the expansion cards.

8. The computer program product of claim 7, wherein the computer usable program code for determining a configuration comprises:
    computer usable program code for calculating the cumulative throughput of the plurality of expansion cards for a plurality of possible configurations.

9. The computer program product of claim 8, wherein the computer usable program code for calculating the cumulative throughput of the plurality of expansion cards for a plurality of possible configurations comprises:
    computer usable program code for determining the maximum throughput of an individual combination of one of the plurality of expansion cards and one of the plurality of slots by identifying the greatest multiple of the identified current link speed and the identified current link width of the expansion card, wherein the greatest multiple is not based on an identified current link speed that exceeds the link speed supported by the slot or an identified current link width that exceeds the link width supported by the slot.

10. The computer program product of claim 7, wherein the computer readable storage medium is a system BIOS.

11. The computer program product of claim 7, wherein each of the expansion cards comprises a link capabilities register, wherein the link capabilities register stores data indicating supported link speeds and maximum link width of the expansion card.

12. The computer program product of claim 7, wherein each of the expansion cards comprises a link status register, wherein the link status register stores data indicating a current link speed of the expansion card.

13. The computer program product of claim 7, further comprising:
    computer usable program code for displaying a recommended configuration of the expansion cards in the slots of the computer system.

14. The computer program product of claim 7, wherein the recommended configuration optimizes the throughput of one of the expansion cards without regard to the throughput of the other expansion cards.

15. The computer program product of claim 14, wherein the one optimized expansion card is designated by user preferences.

16. The computer program product of claim 14, further comprising:
    computer usable program code for monitoring usage of each of the expansion cards; and
    computer usable program code for identifying the one expansion card for optimizing based on the monitored usage.

17. The computer program product of claim 7, further comprising:
    computer usable program code for monitoring usage of each of the expansion cards; and
    computer usable program code for recommending a configuration of the expansion cards that correlates throughput with the monitored usage of each expansion card.

18. The computer program product of claim 7, further comprising:
    computer usable program code for detecting a condition selected from the group consisting of expansion card removal and expansion card installation, wherein the removal or installation of an expansion card results in a change in currently installed expansion cards; and
    computer usable program code for preparing and displaying a new configuration for the currently installed expansion cards.

19. The computer program product of claim 7, further comprising:
    computer usable program code for storing the identified current link speed and current link width for each of the plurality of expansion cards at each of the set slot widths.

20. The computer program product of claim 19, further comprising:
    computer usable program code for using the stored link speed and link width in subsequent configuration determinations.

21. The computer program product of claim 20, further comprising:
    computer usable program code for initiating the subsequent configuration determination in response to detecting a condition selected from the group consisting of a change in the configuration of the expansion cards, a change in user preference of one or more expansion card priority, and a change in load applied to one or more of the expansion cards.

22. The computer program product of claim 19, further comprising:
   computer usable program code for determining that an expansion card has been moved to an expansion card slot that supports one or more additional slot width for which there is no stored link speed and link width associated with the moved expansion card; and
   computer usable program code for serially setting the slot width of the slot connected to the moved expansion card to the one or more additional slot width;
   computer usable program code for retraining the moved expansion card at each of the one or more additional slot widths;
   computer usable program code for identifying a current link speed and a current link width for the moved expansion card at each of the one or more additional slot widths that are set; and
   computer usable program code for determining a configuration of the plurality of expansion cards within the plurality of expansion card slots that will improve collective throughput of the expansion cards.

23. The computer program product of claim 7, further comprising:
   computer usable program code for identifying link capabilities for each of a plurality of expansion cards connected in a plurality of slots in a computer system, wherein the link capabilities for each expansion card include each link width supported by the expansion card and a maximum speed of the expansion card at each supported link width;
   computer usable program code for identifying any of the plurality of expansion cards having link capabilities that are greater than the link capabilities of the slot currently supporting the expansion card; and
   computer usable program code for prompting the user to move the identified expansion cards to a different slot having link capabilities equal to or greater than the link capabilities of the expansion card.

* * * * *